(No Model.)

J. BLÄSI.
ANIMAL TRAP.

No. 452,209. Patented May 12, 1891.

Witnesses
Wm. S. Hodges
Arthur Perkins

Inventor
Joseph Bläsi
By Patrick O'Farrell
Attorney

UNITED STATES PATENT OFFICE.

JOSEPH BLÄSI, OF EVEREST, KANSAS, ASSIGNOR OF ONE-HALF TO NICOLAS FRANCIS HESS, OF SAME PLACE.

ANIMAL-TRAP.

SPECIFICATION forming part of Letters Patent No. 452,209, dated May 12, 1891.

Application filed May 5, 1890. Serial No. 350,720. (No model.)

*To all whom it may concern:*

Be it known that I, JOSEPH BLÄSI, a citizen of the United States of America, residing at Everest, in the county of Brown and State of Kansas, have invented certain new and useful Improvements in Animal-Traps, of which the following is a specification, reference being had therein to the accompanying drawings.

This invention relates to certain new and useful improvements in animal-traps; and it comprises the detail construction, combination, and arrangement of parts, substantially as hereinafter fully set forth, and particularly pointed out in the claims.

Figure 1:
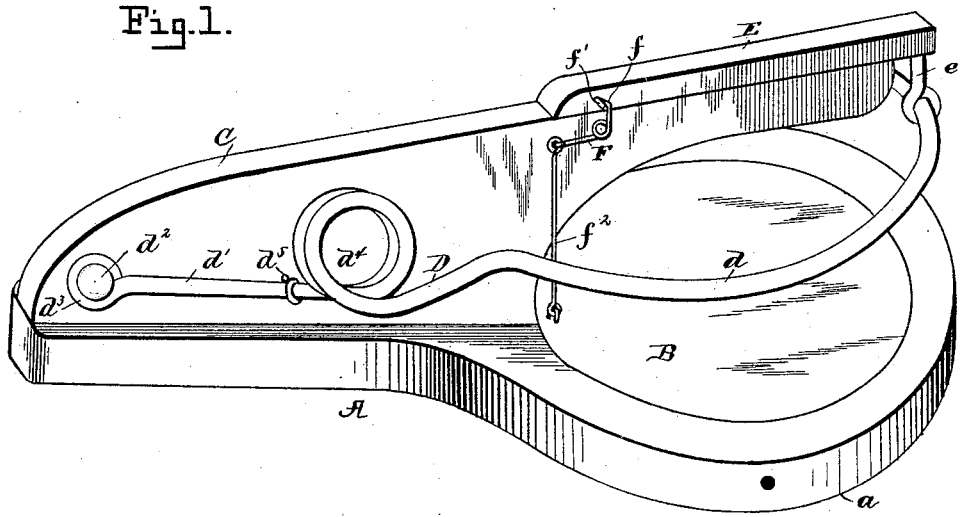
Figure 2:
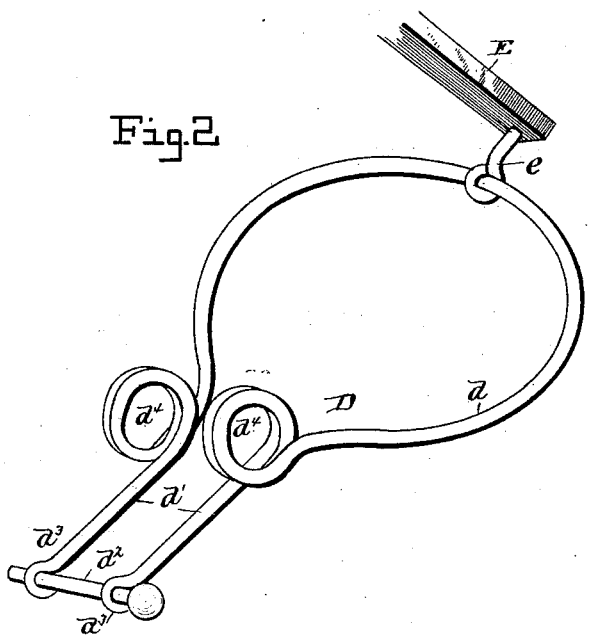
Figure 3:
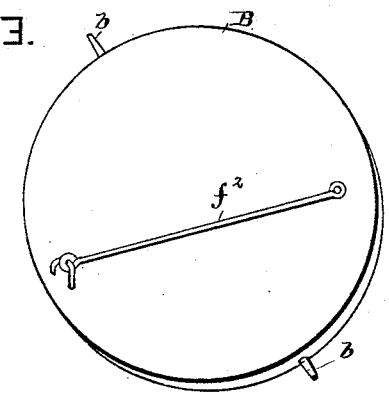
Figure 4:
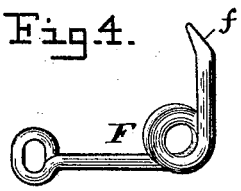

In the accompanying drawings, Figure 1 is a view in side elevation of my improved trap. Fig. 2 is a view in perspective of the spring or jaw. Figs. 3 and 4 are views of details.

Referring to the drawings, A designates a base board or plate having at its forward end a ring or loop $a$ formed therewith and provided with a central circular opening.

B is a trip-board, which is pivotally mounted in this ring or loop by studs or trunnions $b$, projecting from said trip-board at diametrically-opposite points. To the base board or plate A is secured one end of an overhanging arm C, which is curved on its under side and projects horizontally over the trip-board B.

D is a spring-jaw, which consists of a single wire rod bent to form an outer circular portion $d$, corresponding to the ring or loop $a$ of the base-board, and its ends are formed into parallel arms $d'$, which extend on either side of arm C, and are pivotally secured to said arm by a bolt $d^2$, passed through eyes $d^3$, formed by said wire rod. A bend or coil $d^4$ is formed in each arm $d'$ adjacent to a securing or holding staple $d^5$, driven into arms C.

E is an arm, which is secured by a link $e$ to the extreme forward portion of spring-jaw D, and it is designed to rest upon the overhanging arm C when the trap is set. A bell-crank lever F is fulcrumed on arm C, and its outer hooked end $f$ is designed to engage and hold a stud or pin $f'$, projecting from the inner end of arm E. The other end of said bell-crank lever is connected by a link $f^2$ with the trip-board B.

In practice the trap is set by causing the bell-crank lever to engage and hold the inner end of arm E, and in this manner the spring-jaw is raised and held elevated, the trip-board being then in a horizontal position. The bail is placed at any convenient point, so that immediately upon the weight of the animal coming upon the trip-board the latter moves on its pivots, causing the disengagement of the bell-crank lever with the pin of the arm E and permitting the spring-jaw to fly instantly and hold the animal firmly between it and the base-board. This action of the spring-jaw generally results in the instantaneous killing of the entrapped animal.

My improved trap is extremely simple, cheap, and durable, and is most effective in its working.

I claim as my invention—

1. The herein-described improved animal-trap, comprising the base-board having an overhanging arm and a forward loop or ring, the pivoted trip-board located in said loop or ring, the spring-jaw, the arm secured thereto, the bell-crank lever engaging said arm, and the link connecting said bell-crank lever and trip-board, substantially as set forth.

2. The herein-described improved animal-trap, comprising the base-board, the vertically-disposed overhanging arm, the spring-jaw having a forward circularly-bent portion and parallel arms extending on either side of said overhanging arm, to which they are pivotally secured, the trip-board, the arm connected to said spring-jaw and designed to rest on said overhanging arm, the stud or pin projecting from said arm, and the bell-crank lever engaging said stud or pin and connected to said trip-board, substantially as set forth.

JOSEPH BLÄSI.

Witnesses:
J. B. GREEN,
W. M. HETHERINGTON.